2,926,149

PARA-α-CUMYLPHENOL-PARA-SUBSTITUTED-PHENOL-FORMALDEHYDE RESIN

Frank Backer, North Bergen, N.J., assignor to Allied Chemical Corporation, a corporation of New York No Drawing. Application July 24, 1956
Serial No. 599,696

22 Claims. (Cl. 260—19)

This invention relates to phenol-formaldehyde resins and more particularly refers to phenolic, non-heat-reactive oil-soluble resins for use in surface coatings.

Certain surface coatings, which include can coatings, drum linings, industrial finishes, tank car linings, aircraft finishes, marine varnishes and related products, possess unique properties. These properties are characterized by outstanding flexibility and durability, and resistance to acid and alkali. The resin portion of these coatings contributes a major projortion of these favorable properties. Paraphenylphenol-formaldehyde resin has been the only phenolic resin meeting the strict requirements for these coatings and has been regarded by the industry as the standard for substituted phenolic resins. Unfortunately, paraphenylphenol, in addition to being expensive, has always been in short supply and industry has been unable to make enough resins therefrom to satisfy the general demands. Numerous attempts have been made to prepare resins with other substituted phenols but without success since none of them had the requisite properties needed for these special coatings.

An object of the present invention is to provide a phenolic resin which has superior chemical resistance to acid and alkali and which imparts flexibility, durability and hardness and is eminently suitable in all respects for special surface coating.

A further object of the present invention is to provide a process for the preparation of a phenolic coating resin having exceptional chemical and physical properties adapted for special surface coating such as can coatings, drum linings, aircraft finishes, marine varnishes and the like.

Other objects and advantages will be apparent from the following description.

In the course of extensive investigation and experimentation with numerous substituted phenolic compounds for reaction with formaldehyde in an attempt to produce a resin having the desirable characteristics of paraphenylphenol-formaldehyde resin I finally narrowed the list down to para-α-cumylphenol-formaldehyde resin which possessed good alkali- and acid-resistance. However, when the cumylphenol resin was cooked in the conventional way with a drying oil such as tung oil (China-wood oil) or linseed oil to form a varnish, it was found the varnish clouded or had cloud-forming tendencies during storage making it unsuitable for these special surface coatings. Further investigative work was conducted to eliminate the cloud formation of the para-α-cumylphenol-formaldehyde oleoresinous material without destroying the outstanding physical and chemical properties of the resin and finally I succeeded in eliminating the undesirable cloud-forming tendency of para-α-cumylphenol-formaldehyde resin while preserving its desirable properties. I found that by coreacting cumylphenol with another para-substituted-phenol selected from the group consisting of a para-alkyl-substituted-phenol wherein the alkyl group has 3-10 inclusive carbon atoms and 2,2'-bis-(dihydroxy diphenyl)-propane and mixtures thereof and formaldehyde, this cloud-forming tendency can be overcome. The preferred alkyl phenols are para-tertiary-butylphenol, para-tertiary-amylphenol, para-octylphenol, 2,2'-bis-(dihydroxy diphenyl)-propane of which para-tertiary-butylphenol is particularly desired due to its imparting outstanding hardness to oleoresinous varnish films. An alkyl-phenol-formaldehyde resin by itself does not meet the strict requirements with respect to chemical and physical properties for use in special coatings and it is surprising that the addition of an alkyl-substituted-phenol such as tertiary-butylphenol did not cause deterioration of the properties of the resin varnish film when added to the para-α-cumylphenol and formaldehyde. As a matter of fact the varnishes produced from the new para-α-cumylphenol-para-tertiary-butylphenol-formaldehyde resin have properties superior to the paraphenylphenol resins. For example: in fifteen- and thirty-gallon tung oil varnish films, the para-α-cumylphenol-para-tertiary-butylphenol-formaldehyde resin exhibits better adhesion (as tested by the Bell Laboratories' pocket-type adhesion tester); the para-α-cumylphenol-para-tertiary-butylphenol-formaldehyde resin varnish films have better outdoor stability; and a unique feature of fifteen-gallon tung oil varnishes made with para-α-cumylphenol-para-tertiary-butylphenol-formalderyde resin is that mineral spirits can be used as the only solvent. Such varnishes have the advantage of a higher flash point than those prepared with addition of xylol and furthermore contribute to materially lowering cost in that mineral spirits are much less expensive than xylol.

In accordance with the present invention para-α-cumylphenol-para-substituted-phenol-formaldehyde resins having outstanding chemical and physical characteristics adapted particularly for special surface coatings may be prepared by heating a mixture of para-α-cumylphenol and a para-substituted-phenol selected from the group consisting of a para-alkyl-substiutted-phenol wherein the alkyl group has 3–10 inclusive carbon atoms and 2,2'-bis-(dihydroxy diphenyl)-propane-

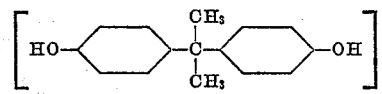

in a molar ratio of 0.33:0.67 to 0.90:0.10, preferably 0.60:40 to 0.85:0.15 of para-α-cumylphenol to para-substituted-phenol together with formaldehyde, preferably in the form of paraformaldehyde, in a molar proportion of formaldehyde to total phenol, i.e. total mols of para-α-cumylphenol and para-substituted-phenol, of 0.5–1.5, preferably 1.0–1.3 mols formaldehyde per mol of total phenol, in the presence of an acid catalyst at a temperature within the range of about 75–250° C., preferably within the range of 85–125° C., to effect reaction of the phenols and formaldehyde. The reaction mixture may be bodied by heating to a temperature in excess of 200° C., preferably within the range of 200–300° C.

Para-α-cumylphenol is a known compound which can be obtained either from phenol and α-methylstyrene in the presence of an acid catalyst or directly as a by-product of the cumene phenol process. Alkyl phenols such as para-tertiary-butylphenol are also well known available compounds. The resins of the present invention as illustrated by para-α-cumylphenol-para-tertiary-butylphenol-formaldehyde resin may be prepared by charging para-α-cumylphenol and para-tertiary-butylphenol in the desired proportion, as previously outlined, to a kettle equipped with a stirrer and provided with a jacket for heating the contents, and the mixture of phenols heated to a temperature of 90–120° C. to melt the contents. Paraformaldehyde, in an amount of about 0.5–1.5 mols per mol of total phenols, and a small amount of acid catalyst, such as sulfuric acid, hydrochloric acid, monochloroacetic acid, dichloroacetic acid, trichloroacetic acid, phosphoric acid, oxalic acid, about 1–10% by weight of the charge, is added to the phenols in the kettle. Oxalic acid is the preferred catalyst and preferably should be added in the form of a solution in water and follow the addition of paraformaldehyde. The reaction mixture is maintained at a temperature of about 95–110° C. for a period of about 2–4 hours. The reaction mixture is then rapidly heated to about 220° C. until the melting point of the resin reaches the desired value which may range from about 80–150° C., preferably about 105–125° C. As a precautionary measure, when the temperature reaches 160° C. during the heating-up period, the melting point of the reaction mixture should be checked every fifteen minutes. Ordinarily, the reaction mixture may be bodied to the desired melting point in a period of 3–5 hours. To remove any solid impurties the hot resin is dumped through a 40-mesh screen into stainless steel pans and allowed to solidify. The properties of the para-α-cumylphenol-para-tertiary-butylphenolformaldehyde resin are:

| | |
|---|---|
| Melting point, Bar Brush, ° C. | 80–150 |
| Free phenol, percent | 1.5 max. |
| Ash, at 540° C., percent | 0.3 max. |
| Water content, Karl Fischer, percent | 0.5 max. |
| Color, Hellige[1] | 7 max. |

[1] 50% solution of resin in nitration toluene.

Para - α - cumylphenol - para-tertiary - butylphenol-formaldehyde resin can be cooked to any desired oil length with commonly used drying oils. Owing to its high solubility in oil, it can be processed into very short oil varnishes as exemplified by the five-gallon tung oil formula described below:

FIVE-GALLON TUNG OIL VARNISH

| Formulation | Lb. | Gal. |
|---|---|---|
| Para-α-cumylphenol-para-tertiary-butylphenol-formaldehyde Resin | 100 | |
| Tung Oil | 39 | 5 |
| Xylene | 139 | 19.5 |
| 6% Cobalt Naphthenate | 0.01% | as metal |
| 6% Manganese Naphthenate | 0.04% | based on |
| 24% Lead Naphthenate | 0.5% | oil. |

The following is a fifteen-gallon tung oil varnish formulation:

FIFTEEN-GALLON TUNG OIL VARNISH

| Formulation | Lb. | Gal. |
|---|---|---|
| Para-α-cumylphenol-para-tertiary-butylphenol-formaldehyde Resin | 100 | |
| Tung Oil | 117 | 15 |
| Mineral Spirits | 218 | 33.5 |
| 6% Cobalt Naphthenate | 0.01% | as metal |
| 6% Manganese Naphthenate | 0.04% | based on |
| 24% Lead Naphthenate | 0.5% | oil. |

The formulation and cooking procedure for varnishes of various lengths based on tung oil, linseed oil and combinations of the two oils is as follows: Charge all of tung oil and heat to 400° F. (204° C.). Add 75 lbs. of resin, raise temperature to 565° F. (296° C.) over a period of 15 minutes and add balance of resin. Cool quickly to 500° F. (260° C.), then slowly to 450° F. (232° C.). Thin with all of solvent and add driers. In an alternate procedure charge 87.8 lbs. (11.3 gals.) of tung oil and all of resin, heat rapidly to 565° F. (296° C.) and add balance of tung oil. Cool to 475° F. (246° C.) and hold for a short time to body. Then cool to 450° F. (232° C.) and add all of mineral spirits and the driers.

Typical applications data for formulations of para-α-cumylphenol-para - tertiary - butylphenol - formaldehyde resin for varnishes of 5, 15, 30 and 50 gallon lengths with tung oil and linseed oil are illustrated in Table 1 below:

Table 1.—Typical applications data

| Type of Oil | Tung | Tung | Tung | Tung-Linseed | Linseed | Tung |
|---|---|---|---|---|---|---|
| Oil Length, Gal | 5 | 15 | 30 | 30 | 30 | 50. |
| Varnish Tests: | | | | | | |
| Percent Solids | 50 | 50 | 50 | 50 | 50 | 50. |
| Appearance | Clear | Clear | Clear | Clear | Clear | Clear. |
| Color, Gardner | 12 | 13 | 11 | 11 | 14 | 10. |
| Viscosity, Gardner | C | H-1 | K | K-L | T | R-S. |
| Film Tests: | | | | | | |
| Drying Time[1]— | | | | | | |
| Touch, hr | | ¾ | 3 | ½ | 2 | 1. |
| Hard, hr | 2 | 23 | 17 | 16 | 24 | 23. |
| Sward Hardness | 32 | 26 | 12 | 9 | 6 | 11. |
| Resistance Tests: | | | | | | |
| in 3% NaOH soln, hr | >360 Slight Blush. | >360 Passed | 144 Passed | 51 Passed | 20 Passed | 36. Passed. |
| 15 min. in boiling water | | | | | | |

[1] Drying time was determined mechanically with the Gardner Drying Time Recorder. Data so obtained are not always comparable to drying times determined by the finger tip method.

The following examples illustrate the present invention.

*Example 1.*—Para-α-cumylphenol-2,2'-bis-(dihydroxy diphenyl)-propane-formaldehyde resin was prepared as follows: 75 parts by weight of para-α-cumylphenol and 25 parts by weight of 2,2'-bis-(dihydroxy diphenyl)-propane were charged to a kettle and heated to 100–110° C. to melt the charge. When the charge was fully melted 38.4 parts by weight of an uninhibited 37% formaldehyde solution was introduced into the reaction vessel. As a result of the addition of the cold formaldehyde solution the temperature dropped to 79° C. at which point 2 parts by weight of trichloroacetic acid was added. The reaction temperature was maintained at 78–82° C. and the mixture reacted at that temperature for 3 hours until the free formaldehyde concentration decreased to 2%. At the end of the reaction period the mixture was further heated so as to first distill at atmospheric pressure water and chloroform, decomposition products from trichloroacetic acid, and then to strip under reduced pressure water present in the reaction mixture. The distillation of the above constituents required 5 hours. At the end of this period the temperature rose to 150° C. at which point the resin was discharged from the reaction vessel and allowed to solidify at room temperature. The resulting resinous product was a clear amber solid having a melting point of 92° C.

*Example 2.* — Para-α-cumylphenol-para-octylphenol-para-nonylphenol-formaldehyde resin was prepared as follows: 72 parts by weight of para-α-cumylphenol, 14 parts by weight of para-octylphenol and 14 parts by weight of para-nonylphenol were charged to a kettle and heated to 85° C. to melt the charge. At that temperature 3 parts by weight of trichloroacetic acid was added to the reaction mixture. This step was followed by an addition of 56.5 parts by weight of an uninhibited 37% formaldehyde solution introduced dropwise from a graduated dropping funnel over a period of 2½ hours. During the addition of the formaldehyde solution the temperature was maintained at 85–90° C. The reaction mixture was reacted at 90° C. for 4 hours. At the end of the reaction period the mixture was further heated so as to first distill at atmospheric pressure water and chloroform, decomposition products from trichloroacetic acid, and then to strip under reduced pressure water present in the reaction mixture. The distillation of the above constituents required 5 hours. At the end of this period the temperature rose to 150° C. at which point the resin was discharged from the reaction vessel and allowed to solidify at room temperature. The resulting product was a clear amber solid having a melting point of 80° C.

*Example 3.* — Para-α-cumylphenol-para-nonylphenol-formaldehyde resin was prepared as follows: 86 parts by weight of para-α-cumylphenol and 14 parts by weight of para-nonylphenol were charged to a kettle and heated to 90° C. to melt the charge. At that temperature 5.4 parts by weight of a 37.5% hydrochloric acid solution was introduced into the reacting mixture. This step was followed by an addition of 46.5 parts by weight of an uninhibited 37% formaldehyde solution introduced dropwise from a graduated dropping funnel over a period of 75 minutes. During the addition of the formaldehyde solution the temperature was maintained at 85–90° C. The reaction mixture was then reacted at 90° C. for 3½ hours. This step was followed by a dehydration under reduced pressure to remove water present in the reaction mixture. The distillation was completed in 3 hours. At the end of this period the temperature rose to 150° C. at which point the resin was discharged and allowed to solidify at room temperature. The resulting resinous product was a clear amber solid having a melting point of 95° C.

*Example 4.* — Para-α-cumylphenol-para-tertiary-amylphenol-formaldehyde resin was prepared as follows: 86 parts by weight of para-α-cumylphenol and 14 parts by weight of para-tertiary-amylphenol were charged to a kettle and heated to 100–120° C. to melt the charge. The reaction mixture was then cooled to 80° C. at which point 3 parts by weight of trichloroacetic acid was introduced into the reaction mixture. The reaction mass was then heated to 85° C. and 47 parts by weight of an uninhibited 37% formaldehyde solution added dropwise from a graduated dropping funnel over a period of 75 minutes. During the addition of the formaldehyde solution the temperature was maintained at 85–90° C. The reaction mixture was then held at 88–90° C. for 2 hours at the end of which time the free formaldehyde concentration of the reaction mass decreased to 3.2%. At the end of the reaction period the mixture was further heated so as to first distill at atmospheric pressure water and chloroform, decomposition products from trichloroacetic acid, and then to strip under reduced pressure water present in the reaction mixture. The distillation of the above constituents required 4 hours. At the end of this period the temperature rose to 150° C. at which point the resin was discharged and allowed to solidify at room temperature. The resulting resinous product was a clear amber solid having a melting point of 78° C.

*Example 5.* — Para-α-cumylphenol-para-tertiary-butylphenol-formaldehyde resin was prepared as follows: 86 parts by weight of para-α-cumylphenol and 14 parts by weight of para-tertiary-butylphenol were charged to a kettle and heated to 100–120° C. to melt the charge. The reaction mixture was then cooled to 85° C. at which point 3 parts by weight of trichloroacetic acid was introduced into the reacting mixture. The reaction mass was then heated to 90° C. and 48 parts by weight of an uninhibited 37% formaldehyde solution added dropwise from a graduated dropping funnel over a period of 75 minutes. During the addition of the formaldehyde solution the temperature was maintained at 85–90° C. The reaction mixture was then held at 90° C. for 3 hours at the end of which time the free formaldehyde concentration of the reaction mass decreased to 2.9%. At the end of the reaction period the mixture was further heated so as to first distill at atmospheric pressure water and chloroform, decomposition products from trichloroacetic acid, and then to strip under reduced pressure water present in the reaction mixture. The distillation of the above constituents required 3 hours. At the end of this period the temperature rose to 150° C. at which point the resin was discharged from the reaction vessel and allowed to solidify at room temperature. The resulting resinous product was a clear amber solid having a melting point of 70° C.

*Example 6.* — Para-α-cumylphenol-para-nonylphenol-formaldehyde resin was prepared as follows: 86 parts by weight of para-α-cumylphenol and 14 parts by weight of para-nonylphenol were charged to a kettle and heated to 60–65° C. to melt the above constituents. 17 parts by weight of powdered paraformaldehyde followed by 3 parts by weight of oxalic acid were then added to the reaction vessel. The reaction mixture was carefully heated to 120° C. in 1 hour and held at 120–125° C. and atmospheric pressure for 2 hours. On completion of this holding cycle the temperature was raised in 50 minutes to 220–230° C. and held at that temperature for 30 minutes. The resulting resin was then discharged from the reaction vessel and allowed to solidify at room temperature. The product was a clear amber resinous solid having a melting point of 105° C.

*Example 7.* — Para-α-cumylphenol-para-octylphenol-formaldehyde resin was prepared as follows: 50 parts by weight of para-α-cumylphenol and 50 parts by weight of para-octylphenol were charged into an open pressure vessel and allowed to melt. At 50° C. 17.4 parts by weight of powdered paraformaldehyde and 3 parts by weight of oxalic acid were added to the charge. The reaction vessel was closed and heated within 70 minutes to 120° C. An internal pressure of 10–25 p.s.i. was thereby developed. The reaction mixture was held for 3 hours at 120–130° C. and an internal pressure of 10–25 p.s.i. At the end of the holding period the vessel was vented to the atmosphere and the reaction mass heated at atmospheric pressure to 230–240° C. within 90 minutes. It was held at 230–240° C. for 45 minutes, discharged from the reaction vessel and allowed to solidify at room temperature. A clear amber resinous product was obtained which had a melting point of 140° C.

*Example 8.*—Para-α-cumylphenol-para - nonylphenol-formaldehyde resin was prepared as follows: 50 parts by weight of para-α-cumylphenol and 50 parts by weight of para-nonylphenol were charged into an open pressure vessel and allowed to melt. At 50° C. 16.9 parts by weight of powdered paraformaldehyde and 3 parts of oxalic acid were added to the charge. The reaction vessel was closed and heated gradually to 115–120° C. within 1 hour. Thereby was developed an internal pressure of 5–10 p.s.i. The reaction mixture was held at 115–125° C. and 5–10 p.s.i. for 3 hours. At the end of the holding period the vessel was vented to the atmosphere and the reaction mass heated at atmospheric pressure to 230–240° C. in 1 hour. It was then held at 230–240° C. for 50 minutes, discharged from the reaction vessel and allowed to solidify at room temperature. A clear amber resinous product was obtained which had a melting point of 123° C.

*Example 9.* — Para-α-cumylphenol-para-octylphenol-formaldehyde resin was prepared as follows: 50 parts by weight of para-α-cumylphenol and 50 parts by weight of para-octylphenol were charged into an open pressure vessel and allowed to melt. At 50° C. 13 parts of powdered para-formaldehyde and 3 parts of oxalic acid were added to the charge. The reaction vessel was closed and heated to 120° C. within 1 hour. An internal pressure of 10–25 p.s.i. was thereby developed. The reaction mass was held for 3 hours at 120–130° C. and an internal pressure of 10–25 p.s.i. At the end of the holding period the vessel was vented to the atmosphere and the reaction mass heated at atmospheric pressure to 230° C. in 75 minutes. It was then held at 230–235° C. for 1 hour, discharged from the reaction vessel and allowed to solidify at room temperature. A clear amber resinous product was obtained which had a melting point of 90° C.

*Example 10.*—Para - α - cumylphenol - para - tertiary-butylphenol-formaldehyde resin was prepared as follows: 80 parts by weight of para-α-cumylphenol and 20 parts by weight of para-tertiary-butylphenol were charged to a kettle and heated to 100–120° C. to melt the charge. The reaction mass was then cooled to 93° C. and 15.2 parts by weight of powdered paraformaldehyde added followed by 1 part by weight of powdered oxalic acid. The reaction mixture was heated in 25 minutes to 120° C. and held between 120–125° C. for 2 hours. It was then heated to 220° C. in 50 minutes and held at that temperature for two hours. The resin was then dumped and allowed to solidify at room temperature. A clear amber product was obtained which had a melting point of 75° C.

*Example 11.*—Para-α-cumylphenol-para-tertiary-butylphenol-formaldehyde resin was prepared as follows: 40 parts by weight of para-α-cumylphenol and 60 parts by weight of para-tertiary-butylphenol were charged to a kettle and heated to 100–120° C. to melt the charge. The reaction mixture was then cooled to 93° C. at which point 20.4 parts by weight flake paraformaldehyde was added. Then an aqueous solution of oxalic acid composed of 3 parts by weight of powdered oxalic acid and 9 parts by weight of water was added to the above ingredients. The reaction mixture was heated to 120° C. in 45 minutes and held at 115–124° C. for 2 hours. Thereafter the reaction was heated to 220° C. in 1 hour. The resin was quite viscous at the lower temperature but became increasingly easier to handle as the temperature rose to 220° C. It was held at 220–230° C. for 1 hour and then discharged from the reaction vessel and allowed to solidify at room temperature. Part of the batch was neutralized with 10 parts by weight of purified triethanolamine before it was discharged. Both products, the unneutralized and the neutralized one, were clear amber solids having melting points of 129° C. and 119° C., respectively.

*Example 12.*—Para-α-cumylphenol-para-tertiary-butylphenol-formaldehyde resin was prepared as follows: 90 parts by weight of para-α-cumylphenol and 10 parts by weight of para-tertiary-butylphenol were charged to a kettle and heated to a temperature of 110° C. to allow above ingredients to melt. The reaction mixture was cooled to 93° C. and 19.3 parts by weight of flake paraformaldehyde was added. Then an aqueous solution of oxalic acid composed of 1 part by weight oxalic acid and 4 parts by weight of tap water was added to the reaction mixture. The reaction was heated carefully to a temperature of 105° C. in about 10 minutes. This reaction temperature was then held for 30 minutes whereupon the reaction mass was heated to 220° C. in 35 minutes and this temperature held for 1 hour. The resin was then dumped and allowed to solidify at room temperature. The resulting resinous product was a clear amber solid having a melting point of 98° C.

*Example 13.*—Para-α-cumylphenol-para-nonylphenol-formaldehyde resin was prepared as follows: 86 parts by weight of para-α-cumylphenol and 14 parts by weight of para-nonylphenol were charged to a kettle and heated to 90° C. to melt the charge. At that temperature 2.7 parts by weight of a 37.5% hydrochloric acid solution was introduced into the reaction mixture. This step was followed by an addition of 46.5 parts by weight of an uninhibited 37% formaldehyde solution introduced dropwise from a graduated dropping funnel over a period of 3½ hours. During the addition of the formaldehyde solution, the temperature was maintained at 85–90° C. The reaction mixture was then reacted at 90° C. for 2 hours until a free formaldehyde concentration of less than 3% was obtained. This step was followed by a dehydration under reduced pressure to remove water present in the reaction mixture. The distillation was interrupted after 2 hours when most of the water was stripped and the temperature reached 105° C. At this point 0.1 part by weight of an 85% phosphoric acid solution was added to the reaction mass. Reduced pressure was reapplied and the resinous mass reheated to 140° C. It was then held for 30 minutes at 140–150° C. under reduced pressure. At the end of the holding period the resin was discharged and allowed to solidify at room temperature. The resulting product was a clear amber solid having a melting point of 85° C.

*Example 14.*—Para-α-cumylphenol-para-tertiary-butylphenol-formaldehyde resin was prepared as follows: 80 parts by weight of para-α-cumylphenol and 20 parts by weight of para-tertiary-butylphenol were charged to a kettle and heated to a temperature of 110–120° C. for about 20 minutes to fully melt the charge. The reaction mixture was then cooled to 90–100° C. which required about 75 minutes. 20.3 parts by weight of flake paraformaldehyde was added to the reaction mixture. Then an aqueous solution of oxalic acid composed of 1 part by weight oxalic acid and 2 parts by weight distilled water was added to the reaction mixture. The reaction mass was heated carefully because the reaction is slightly exothermic to a temperature of 105° C. in a period of about 10 minutes. This reaction temperature was held for 2 hours. Thereafter the reaction mass was heated as rapidly as possible to 220° C. and held at 220° C. until the melting point of the resin reached 116° C.±1° C. The time required for this was 235 minutes. The resin was then dumped through a 40-mesh screen into stainless steel pans and allowed to solidify. The yield of dry resin was 101.4 parts by weight, which yield, on the basis of pound of dry resin/pound of phenol charged, is 101.4%. The physical properties of the resultant resin are as follows:

| | |
|---|---|
| Melting point, Bar Brush, ° C. | 117 |
| Free phenol, percent | 1.4 |
| Ash, at 540° C., percent | 0.2 |
| Water content, Karl Fischer, percent | 0.3 |

Varnishes of thirty-gallon oil length were prepared from China-wood oil and para-α-cumylphenol-para-tertiary-butylphenol-formaldehyde resin prepared as above. The results of tests on the resulting films are recorded in Table 2 below:

It should be noted that the caustic resistance of the shorter oil varnishes is outstanding. The resin alone had not been attacked in over six weeks when immersed in a 5% caustic soda solution. Competitive resins, made with para-tertiary-butylphenol, and made with para-phenylphenol, were attacked when immersed in a 5% caustic soda solution for one week. In comparison to para-tertiary-butylphenol-formaldehyde resin varnishes, the para-α-cumylphenol-para-tertiary-butylphenol-formaldehyde resins have superior resistance to boiling water. The fifteen-gallon varnishes made from para-tertiary-butylphenol-formaldehyde resins blushed when subjected to boiling water for fifteen minutes. The para-α-cumylphenol-para-tertiary-butylphenol-formaldehyde resin did not. The slight blush observed in the five-gallon varnish is due to insufficient bodying of the varnish.

Table 2.—Thirty-gallon varnishes

| Resin | R [3] | R [3] | R [3] | R [3] |
|---|---|---|---|---|
| Type of Oil [1] | C.W.O. | C.W.O. | C.W.O. | C.W.O. |
| Method of Cooking [2] | No. 1 | No. 2 | No. 1 | No. 1. |
| Bodying Time, Min | 22 | | 13 | 15. |
| Bodying Temp., C | 238 | | 250 | 255. |
| Solvent Used [1] | M.S. | M.S. | M.S. | M.S. |
| Driers Used: | | | | |
| Percent Metal based on oil— | | | | |
| Pb | 0.5 | 0.5 | 0.5 | 0.5. |
| Mn | 0.1 | 0.1 | 0.1 | 0.1. |
| Co | 0.01 | 0.01 | 0.01 | 0.01. |
| Varnish Properties: | | | | |
| Viscosity (G-H scale) | I-J | K | K-L | M-N. |
| Color (Gardner) | 12 | 11-12 | 11 | 11. |
| Appearance | Clear | Clear | Clear | Clear. |
| Percent Solids | 50 | 50 | 50 | 50. |
| Film Tests: | | | | |
| Drying Time— | | | | |
| Touch, hrs | 3 | 3 | 1 | ⅓. |
| Hard, hrs | 22 | 16⅔ | 13 | 23. |
| Sward Hardness | 12 | 10 | 13 | 11. |
| Resistance: | | | | |
| 3% NaOH solution, hrs | 48 | 144 | 72 | 96. |
| Boiling water, 15 min | Passed | Passed | Passed | Passed. |

[1] M.S.—Mineral spirts. C.W.O.—China-wood oil.
[2] No. 1 Method—Heat resin and 75% of the oil to 290–292° C. and add 25% of the oil. Continue bodying at specified temperature for recorded time. Add thinner and drier.
No. 2 Method—Heat oil alone to 200° C., add 75% of the resin, raise temperature in 15 minutes to 300° C. Add 25% of the resin, cool quickly to 260° C., then slowly to 232° C., until bodied. Add thinner and drier.
[3] R—Para-α-cumylphenol-para-tertiary-butylphenol-formaldehyde resin.

In Table 3 are recorded results of tests with varnishes and variable oil lengths:

To test the utility of the varnish for can coatings, a fifteen-gallon China-wood oil varnish was prepared, Table 3

| Resin | R [3] | R [3] | R [3] | R [3] |
|---|---|---|---|---|
| Type of Oil [1] | C.W.O. | C.W.O. | C.W.O. | C.W.O. |
| Oil Length, gal | 50 | 30 | 15 | 5. |
| Method of Cooking [2] | No. 1 | No. 2 | No. 2 | No. 2. |
| Bodying Time, Min | 15 | | | |
| Bodying Temp., C | 255 | | | |
| Solvent Used [1] | M.S. | M.S. | Xylol | Xylol. |
| Driers Used: | | | | |
| Percent Metal based on oil— | | | | |
| Pb | 0.5 | 0.5 | 0.5 | 0.5. |
| Mn | 0.1 | 0.1 | 0.1 | 0.1. |
| Co | 0.01 | 0.01 | 0.01 | 0.01. |
| Varnish Properties: | | | | |
| Viscosity (G-H scale) | R-S | K | H-I | C. |
| Color (Gardner) | 10-11 | 11-12 | 13-14 | 12-13. |
| Appearance | Clear | Clear | Clear | Clear. |
| Percent Solids | 50 | 50 | 50 | 50. |
| Film Tests: | | | | |
| Drying Time— | | | | |
| Touch, hrs | 1 | 3 | ½ | |
| Hard, hrs | 23 | 16⅔ | 16 | 2. |
| Sward Hardness | 11 | 10 | 16 | 32. |
| Resistance: | | | | |
| 3% NaOH solution, hrs | 32-40 | 144 | >360 | >360. |
| Boiling water, 15 min | Passed | Passed | Passed | Sl. Blush. |

[1] M.S.—Mineral spirits. C.W.O.—China-wood oil.
[2] No. 1 Method—Heat resin and 75% of the oil to 290–292° C. and add 25% of the oil. Continue bodying at specified temperature for recorded time. Add thinner and drier.
No. 2 Method—Heat oil alone to 200° C., add 75% of the resin, raise temperature in 15 minutes to 300° C. Add 25% of the resin, cool quickly to 260° C., then slowly to 232° C., until bodied. Add thinner and drier.
[3] R—Para-α-cumylphenol-para-tertiary-butylphenol-formaldehyde resin.

filmed on tin, baked at 400° F. for 12 minutes, then tested. The results are shown in Table 4:

*Table 4*

| | |
|---|---|
| Resin | R.[1] |
| Bodying time—min. | 19. |
| Bodying temp.—° C. | 250. |
| Solvent used | M.S.[2] |
| Driers | None. |
| Varnish properties: | |
| Viscosity (G–H scale) | R. |
| Color (Gardner) | 11. |
| Appearance | Clear. |
| Percent solids | 50. |
| Tests on baked film: | |
| Wt. (mg./sq. in.) | 6. |
| Thickness (mil) | 0.2. |
| Fabrication | Passed. |
| Color | Gold. |
| Appearance | Clear. |
| Boiling water resistance—2 hrs. | Passed. |
| Alcohol resistance—15 min. | Passed. |
| Dipentene resistance—1 hr. | Passed. |
| Porosity (CuSO$_4$ sol. for 2 min.) | Passed. |

[1] R.—Para-α-cumylphenol-para-tertiary-butylphenol-formaldehyde resin.
[2] M.S.—Mineral spirits.

These tests show that this varnish is suitable for can coatings.

For comparative purposes varnishes were made up in twenty-five-gallon oil length using para-α-cumylphenol-para-tertiary-butylphenol-formaldehyde resin and para-phenylphenol-formaldehyde resin respectively. The varnishes of twenty-five-gallon oil lengths were formulated as follows:

| | | |
|---|---|---|
| Para-α-cumylphenol-para-tertiary-butylphenol-formaldehyde Resin, lbs | 100 | |
| Para-phenylphenol-formaldehyde Resin, lbs | | 100 |
| China-Wood Oil, gals | 12.5 | 12.5 |
| Linseed Oil (Alkali Refined), gals | 12.5 | 12.5 |
| Mineral Spirits, gals | 44.5 | 36.0 |
| Xylol | | 8.5 |

Driers, Naphthenate:
  Lead—0.3% metal on wt. of oil.
  Manganese—0.04% metal on wt. of oil.
  Cobalt—0.01% metal on wt. of oil.

Properties of varnishes were found to compare as follows:

| Viscosity (G–H scale) | C | A |
|---|---|---|
| Color (Gardner) | 12–13 | 14 |
| Appearance | Clear | Clear |
| Percent Solids | 50 | 50 |

The varnish was prepared by placing all of the para-α-cumylphenol - para-tertiary - butylphenol - formaldehyde resin, all the China-wood oil and half of the linseed oil in a kettle and heating to 296° C. The other half of the linseed oil was then added immediately. As soon as the temperature dropped to 232° C., thinner and drier were added. The results of varnish film tests in which para-α-cumylphenol - para-tertiary - butylphenol - formaldehyde resin varnish appears in the center column and para-phenylphenol-formaldehyde resin varnish appears in the right hand column are tabulated below:

| | | |
|---|---|---|
| Drying Time: | | |
|   Touch, hrs | ½ | ½. |
|   Hard, hrs | 3 | 3. |
| Sward Hardness: | | |
|   48 hrs | 20 | 34. |
|   120 hrs | 34 | 36. |
| Mandrel Test: ¼ in | Passed | Passed. |
| Gas Proof Test | do | Do. |
| Boiling Water Resistance: 7 hrs | do | Passed, but slight deterioration was evident. |
| Alkali Resistance: 5% NaOH Solution for 7 hrs. | do | Passed. |

The tests on the two varnishes showed they were about equal in performance. The para-phenylphenol-formaldehyde resin varnish films showed no superiority over the para - α-cumylphenol-para-tertiary-butylphenol-formaldehyde resin varnish films in any test. In the test where the respective films were exposed to boiling water for 7 hours the para-α-cumylphenol-para-tertiary-butylphenol-formaldehyde resin varnish was superior.

The twenty-five-gallon oil length varnishes using para-α - cumylphenol-para-tertiary-butylphenol-formaldehyde resin and para-phenylphenol-formaldehyde resin were incorporated in gray deck paint and the two paints tested for performance.

PROPERTIES OF PAINTS

| | Resin R[1] | Paraphenylphenol Resin |
|---|---|---|
| Viscosity @ 25° C | 72 Krebs units | 68 Krebs units. |
| Ratio of pigment to vehicle solids | 60:40 | 60:40. |
| Solids | 71% | 71%. |
| Fineness of Grind (North Scale) | 4.5 | 4.5. |

RESULTS OF FILM TESTS

| | | |
|---|---|---|
| Mandrel Flexibility | Passed ⅛″ bend | Passed ⅛″ bend. |
| Water Immersion, 24 hr. @ 25° C | Passed | Passed. |
| Odor | Normal | Normal. |
| Compatibility with thinner | Compatible | Compatible. |
| Rosin and Rosin derivatives | None | None. |
| Phenolic Resin | Present | Present. |

[1] Resin R—Para-α-cumylphenol-para-tertiary-butylphenol-formaldehyde resin.

The gray deck paint, using para-α-cumylphenol-para-tertiary-butylphenol-formaldehyde resin in the varnish, meets all resistance requirements for Navy specifications. It is comparable in performance to the gray deck paint made using para-phenylphenol-formaldehyde resin.

Although certain preferred embodiments of the invention have been disclosed for purpose of illustration, it will be evident that various changes and modifications may be made therein without departing from the scope and spirit of the invention.

I claim:

1. A process for the production of non-heat-reactive para - α - cumylphenol - para - substituted - phenol-formaldehyde resin having outstanding chemical and physical characteristics adapted particularly for special surface coatings which comprises heating a mixture of para-α-cumylphenol and a para-substituted-phenol selected from the group consisting of a para-alkyl-substituted-phenol wherein the alkyl group has 3–10 inclusive carbon atoms and 2,2′-bis-(dihydroxy diphenyl)-propane and mixtures thereof in a molar ratio of 0.33:0.67 to 0.90:0.10 of para-α-cumylphenol to para-substituted-phenol together with formaldehyde in the molar proportion of 1.0–1.5 mols of formaldehyde per mol of total phenol, i.e. total mols of para-α-cumylphenol and para-substituted-phenol, in the presence of an acid catalyst at a temperature within the range of about 75–250° C. to effect reaction of the phenols and formaldehyde.

2. A process for the production of non-heat-reactive para - α - cumylphenol - para - substituted - phenol-formaldehyde resin having outstanding chemical and physical characteristics adapted particularly for special surface coatings which comprises heating a mixture of para-α-cumylphenol and a para-substituted-phenol selected from the group consisting of a para-alkyl-substituted-phenol wherein the alkyl group has 3–10 inclusive carbon atoms and 2,2′-bis-(dihydroxy diphenyl)-propane and mixtures thereof in a molar ratio of 0.60:0.40 to 0.85:0.15 of para-α-cumylphenol to para-substituted-phenol together with formaldehyde in the form of para-formaldehyde in the molar proportion of 1.0–1.3 mols of formaldehyde per mol of total phenols, i.e. total mols of para-α-cumylphenol and para-substituted-phenol, in the presence of oxalic acid as a catalyst at a temperature within the range of about 85–125° C. to effect reaction of the phenols and formaldehyde and then bodying the reaction mixture by heating to a temperature within the range of 200–300° C.

3. A process for the production of non-heat-reactive para - α - cumylphenol - para - tertiary - butylphenol-formaldehyde resin having outstanding chemical and physical characteristics adapted particularly for special surface coatings which comprises heating a mixture of para-α-cumylphenol and para-tertiary-butylphenol in a molar ratio of 0.33:0.67 to 0.90:0.10 of para-α-cumylphenol to para-tertiary-butylphenol together with formaldehyde in the molar proportion of 1.0–1.5 mols of formaldehyde per mol of total phenol, i.e. total mols of para-α-cumylphenol and para-tertiary-butylphenol, in the presence of an acid catalyst at a temperature within the range of about 75–250° C. to effect reaction of the phenols and formaldehyde.

4. A process for the production of non-heat-reactive para - α - cumylphenol - para - tertiary - butylphenol-formaldehyde resin having outstanding chemical and physical characteristics adapted particularly for special surface coatings which comprises heating a mixture of para-α-cumylphenol and para-tertiary-butylphenol in a molar ratio of 0.60:0.40 to 0.85:0.15 of para-α-cumylphenol to para-tertiary-butylphenol together with formaldehyde in the form of paraformaldehyde in the molar proportion of 1.0–1.3 mols of formaldehyde per mol of total phenols, i.e. total mols of para-α-cumylphenol and para-tertiary-butylphenol, in the presence of oxalic acid as a catalyst at a temperature within the range of about 85–125° C. to effect reaction of the phenols and formaldehyde and then bodying the reaction mixture by heating to a temperature within the range of 200–300° C.

5. A process for the production of non-heat-reactive para - α - cumylphenol - 2,2' - bis - (dihydroxy diphenyl)-propane-formaldehyde resin having outstanding chemical and physical characteristics adapted particularly for special surface coatings which comprises heating a mixture of para-α-cumylphenol and 2,2'-bis-(dihydroxy diphenyl)-propane in a molar ratio of 0.33:0.67 to 0.90:0.10 of para-α-cumylphenol to 2,2'-bis-(dihydroxy diphenyl)-propane together with formaldehyde in the molar proportion of 1.0–1.5 mols of formaldehyde per mol of total phenol, i.e. total mols of para-α-cumylphenol and 2,2'-bis-(dihydroxy diphenyl)-propane, in the presence of an acid catalyst at a temperature within the range of about 75–250° C. to effect reaction of the phenols and formaldehyde.

6. A process for the production of non-heat-reactive para - α - cumylphenol - 2,2' - bis - (dihydroxy diphenyl)-propane-formaldehyde resin having outstanding chemical and physical characteristics adapted particularly for special surface coatings which comprises heating a mixture of para-α-cumylphenol and 2,2'-bis-(dihydroxy diphenyl)-propane in a molar ratio of 0.60:0.40 to 0.85:0.15 of para-α-cumylphenol to 2,2'-bis-(dihydroxy diphenyl)-propane together with formaldehyde in the form of paraformaldehyde in the molar proportion of 1.0–1.3 mols of formaldehyde per mol of total phenols, i.e. total mols of para-α-cumylphenol and 2,2'-bis-(dihydroxy diphenyl)-propane, in the presence of oxalic acid as a catalyst at a temperature within the range of about 85–125° C. to effect reaction of the phenols and formaldehyde and then bodying the reaction mixture by heating to a temperature within the range of 200–300° C.

7. A process for the production of non-heat-reactive para - α - cumylphenol - para - nonylphenol - formaldehyde resin having outstanding chemical and physical characteristics adapted particularly for special surface coatings which comprises heating a mixture of para-α-cumylphenol and para-nonylphenol in a molar ratio of 0.33:0.67 to 0.90:0.10 of para-α-cumylphenol to para-nonylphenol together with formaldehyde in the molar proportion of 1.0–1.5 mols of formaldehyde per mol of total phenol, i.e. total mols of para-α-cumylphenol and para-nonylphenol, in the presence of an acid catalyst at a temperature within the range of about 75–250° C. to effect reaction of the phenols and formaldehyde.

8. A process for the production of non-heat-reactive para - α - cumylphenol - para - nonylphenol - formaldehyde resin having outstanding chemical and physical characteristics adapted particularly for special surface coatings which comprises heating a mixture of para-α-cumylphenol and para-nonylphenol in a molar ratio of 0.60:0.40 to 0.85:0.15 of para-α-cumylphenol to para-nonylphenol together with formaldehyde in the form of paraformaldehyde in the molar proportion of 1.0–1.3 mols of formaldehyde per mol of total phenols, i.e. total mols of para-α-cumylphenol and para-nonylphenol, in the presence of oxalic acid as a catalyst at a temperature within the range of about 85–125° C. to effect reaction of the phenols and formaldehyde and then bodying the reaction mixture by heating to a temperature within the range of 200–300° C.

9. A process for the production of non-heat-reactive para-α-cumylphenol-para-octylphenol-formaldehyde resin having outstanding chemical and physical characteristics adapted particularly for special surface coatings which comprises heating a mixture of para-α-cumylphenol and para-octylphenol in a molar ratio of 0.33:0.67 to 0.90:0.10 of para-α-cumylphenol to para-octylphenol together with formaldehyde in the molar proportion of 1.0–1.5 mols of formaldehyde per mol of total phenol, i.e. total mols of para-α-cumylphenol and para-octylphenol, in the presence of an acid catalyst at a temperature within the range of about 75–250° C. to effect reaction of the phenols and formaldehyde.

10. A process for the production of non-heat-reactive para-α-cumylphenol-para-octylphenol-formaldehyde resin having outstanding chemical and physical characteristics adapted particularly for special surface coatings which comprises heating a mixture of para-α-cumylphenol and para-octylphenol in a molar ratio 0.60:0.40 to 0.85:0.15 of para-α-cumylphenol to para-octylphenol together with formaldehyde in the form of paraformaldehyde in the molar proportion of 1.0–1.3 mols of formaldehyde per mol of total phenols, i.e. total mols of para-α-cumylphenol and para-octylphenol, in the presence of oxalic acid as a catalyst at a temperature within the range of about 85–125° C. to effect reaction of the phenols and formaldehyde and then bodying the reaction mixture by heating to a temperature within the range of 200–300° C.

11. A process for the production of non-heat-reactive para-α-cumylphenol-para-amylphenol-formaldehyde resin having outstanding chemical and physical characteristics adapted particularly for special surface coatings which comprises heating a mixture of para-α-cumylphenol and para-amylphenol in a molar ratio of 0.33:0.67 to 0.90:0.10 of para-α-cumylphenol to para-amylphenol together with formaldehyde in the molar proportion of 1.0–1.5 mols of formaldehyde per mol of total phenol, i.e. total mols of para-α-cumylphenol and para-amylphenol, in the presence of an acid catalyst at a temperature within the range of about 75–250° C. to effect reaction of the phenols and formaldehyde.

12. A process for the production of non-heat-reactive para-α-cumylphenol-para-amylphenol-formaldehyde resin having outstanding chemical and physical characteristics adapted particularly for special surface coatings which comprises heating a mixture of para-α-cumylphenol and para-amylphenol in a molar ratio of 0.60:0.40 to 0.85:0.15 of para-α-cumylphenol to para-amylphenol together with formaldehyde in the form of paraformaldehyde in the molar proportion of 1.0–1.3 mols of formaldehyde per mol of total phenols, i.e. total mols of para-α-cumylphenol and para-amylphenol, in the presence of oxalic acid as a catalyst at a temperature within the range of about 85–125° C. to effect reaction of the phenols and formaldehyde and then bodying the reaction mixture by heating to a temperature within the range of 200–300° C.

13. A non-heat-reactive para-α-cumylphenol-para-tertiary-butyl-phenol-formaldehyde resin having outstanding chemical and physical characteristics adapted particularly for special surface coatings which is a reaction product produced in the presence of an acid catalyst of para-α-cumylphenol, para-tertiary-butylphenol and formaldehyde in the molar ratio of 0.33:0.67 to 0.90:0.10 of para-α-cumylphenol to para-tertiary-butylphenol and formaldehyde in the molar proportion of 0.5–1.5 mols of formaldehyde per mol of total phenol, i.e. total mols of para-α-cumylphenol and para-tertiary-butylphenol, said para-α-cumylphenol-para-tertiary-butylphenol - formaldehyde resin being further characterized by having a melting point, Bar Brush, of 80–150° C., a maximum free phenol content of 1.5%, a maximum ash at 540° C. of 0.3% and a maximum water content, Karl Fischer, of 0.5%.

14. A non-heat-reactive para-α-cumylphenol-para-tertiary-butylphenol-formaldehyde resin having outstanding chemical and physical characteristics adapted particularly for special surface coatings which is a reaction product produced in the presence of an acid catalyst of para-α-cumylphenol, para-tertiary-butylphenol and formaldehyde in the molar ratio of 0.60:0.40 to 0.85:0.15 of para-α-cumylphenol to para-tertiary-butylphenol together with formaldehyde in the form of paraformaldehyde in the molar proportion of 1.0–1.3 mols of formaldehyde per mol of total phenols, i.e. total mols of para-α-cumylphenol and para-tertiary-butylphenol, said para-α-cumylphenol-para-tertiary-butylphenol-formaldehyde resin being further characterized by having a melting point, Bar Brush, of 105–125° C., a maximum free phenol content of 1.4%, a maximum ash at 540° C. of 0.2% and a maximum water content, Karl Fischer, of 0.3%.

15. A varnish prepared by cooking the para-α-cumylphenol-para-substituted-phenol-formaldehyde resin produced by the process as claimed in claim 1 with a drying oil.

16. A varnish prepared by cooking the para-α-cumylphenol-para-tertiary-butylphenol-formaldehyde resin produced by the process as claimed in claim 3 with a drying oil.

17. A varnish prepared by cooking the para-α-cumylphenol-2,2'-bis(dihydroxy diphenyl)-propane-formaldehyde resin produced by the process as claimed in claim 5 with a drying oil.

18. A varnish prepared by cooking the para-α-cumylphenol-para-nonylphenol-formaldehyde resin produced by the process as claimed in claim 7 with a drying oil.

19. A varnish prepared by cooking the para-α-cumylphenol-para-octylphenol-formaldehyde resin produced by the process as claimed in claim 9 with a drying oil.

20. A varnish prepared by cooking the para-α-cumylphenol-para-amylphenol-formaldehyde resin produced by the process as claimed in claim 11 with a drying oil.

21. A varnish prepared by cooking the para-α-cumylphenol-para-tertiary-butylphenol-formaldehyde resin as clamed in claim 13 with a drying oil.

22. A varnish prepared by cooking the para-α-cumylphenol-para-tertiary-butylphenol-formaldehyde resin as claimed in claim 14 with a drying oil.

References Cited in the file of this patent

UNITED STATES PATENTS

| | | |
|---|---|---|
| 2,058,797 | Honel | Oct. 27, 1936 |
| 2,079,210 | Honel | May 4, 1937 |
| 2,101,944 | Honel | Dec. 14, 1937 |
| 2,249,460 | D'Alelio | July 15, 1941 |
| 2,345,357 | Powers | Mar. 28, 1944 |
| 2,389,078 | Powers | Nov. 13, 1945 |
| 2,586,385 | Runk | Feb. 19, 1952 |

OTHER REFERENCES

Carswell: Phenoplasts, pages 29–31, Interscience (1947.)